US009401825B1

(12) United States Patent
Lu et al.

(10) Patent No.: US 9,401,825 B1
(45) Date of Patent: Jul. 26, 2016

(54) APPARATUS AND METHOD FOR CHANNEL ESTIMATION

(71) Applicant: Industrial Technology Research Institute, Hsinchu (TW)

(72) Inventors: Ming-Ho Lu, Yunlin County (TW); Chi-Tien Sun, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/981,859

(22) Filed: Dec. 28, 2015

(30) Foreign Application Priority Data

Nov. 5, 2015 (TW) .............................. 104136425 A

(51) Int. Cl.
  *H04L 25/02* (2006.01)
  *H04L 27/26* (2006.01)

(52) U.S. Cl.
  CPC .......... *H04L 25/023* (2013.01); *H04L 27/2613* (2013.01)

(58) Field of Classification Search
  CPC ........................... H04L 25/023; H04L 27/2613
  See application file for complete search history.

(56) References Cited

U.S. PATENT DOCUMENTS

| 4,085,378 A | * | 4/1978 | Ryan | ................... H04L 27/2273 329/308 |
| 5,400,363 A | * | 3/1995 | Waugh | ................ H04L 27/2273 329/308 |
| 5,742,637 A | * | 4/1998 | Kanterakis | ............... H03D 3/22 329/304 |
| 5,808,582 A | * | 9/1998 | Woo | ........................ G01S 19/22 342/357.61 |
| 7,333,533 B2 | * | 2/2008 | Takahashi | ............. G01S 19/235 342/357.62 |
| 8,351,494 B2 | | 1/2013 | Kim et al. | |
| 8,675,744 B1 | | 3/2014 | Kasapi et al. | |
| 2011/0292984 A1 | | 12/2011 | Yoshimoto et al. | |

FOREIGN PATENT DOCUMENTS

| CN | 104168227 | 11/2014 |
| TW | I308430 | 4/2009 |
| TW | I461006 | 11/2014 |

OTHER PUBLICATIONS

Joseph A. Fernandez, et al., "Dynamic Channel Equalization for IEEE 802.11p Waveforms in the Vehicle-to-Vehicle Channel," 2010 48th Annual Allerton Conference on Communication, Control, and Computing (Allerton), Sep. 29-Oct. 1, 2010, pp. 542-551.

(Continued)

*Primary Examiner* — Freshteh N Aghdam
(74) *Attorney, Agent, or Firm* — Jianq Chyun IP Office

(57) ABSTRACT

A channel estimation apparatus includes a de-map circuit to map multiple preambles corresponding to multiple channels into real part (I) and imaginary part (Q) in QPSK coordinate. The costas channel estimation circuit receives the real part (I) and the imaginary part (Q) to operate corresponding to one of the BPSK structure and the QPSK structure to proceed calculation of (Q−I)*Sign (I+Q) or Q*Sign (I)−I*Sign (Q) for outputting an output value, wherein Sign(x) represents a sign circuit taking a sign of the x value. The loop filter circuit filters the output value under time domain. The smooth circuit receives the output of the loop filter circuit to perform smooth processing under frequency domain and then feeds back the same to the de-map circuit to continue channel estimation of a next loop, wherein the phases of the preambles are adjusted according to a direction of the output value approaching to zero.

16 Claims, 10 Drawing Sheets

(56) References Cited

OTHER PUBLICATIONS

H. Abdulhamid, et al., "Channel estimation for 5.9 GHz dedicated shortrange communications receiver in wireless access vehicular environments," IET Communications, vol. 1, Issue 6, Dec. 2007, pp. 1274-1279.

Sheetal Kalyani, et al., "Quantised Decision based Gradient Descent Algorithm for fast fading OFDM channels," 2004 IEEE 60th Vehicular Technology Conference (VTC2004-Fall), vol. 1, Sep. 26-29, 2004, pp. 534-537.

Massimiliano Siti, et al., "Low Complexity Decision-Directed Channel Estimation Based on a Reliable-Symbol Selection Strategy for OFDM Systems," 2010 IEEE International Conference on Communications Workshops (ICC), May 23-27, 2010, pp. 1-5.

Zong-Sian Lin, et al., "Design of an OFDM System with Long Frame by the Decision-Aided Channel Tracking Technique," 2006 IEEE International Conference on Electro/information Technology, May 7-10, 2006, pp. 330-333.

J. J. Jaime-Rodr'iguez, et al., "Comparative Performance Analysis of Two Channel Estimation Techniques for DSRC Systems Based on the IEEE 802.11p Standard," 2014 IEEE Central America and Panama Convention (CONCAPAN XXXIV), Nov. 12-14, 2014, pp. 1-6.

* cited by examiner

BPSK

QPSK

APPARATUS AND METHOD FOR CHANNEL ESTIMATION

CROSS-REFERENCE TO RELATED APPLICATION

This application claims the priority benefit of Taiwan application no. 104136425, filed on Nov. 5, 2015. The entirety of the above-mentioned patent application is hereby incorporated by reference herein and made a part of this specification.

TECHNICAL FIELD

The disclosure relates to an apparatus and a method for channel estimation with feeding back after low power high-speed mobile channel decision.

BACKGROUND

In the existing techniques, an orthogonal frequency division multiplexing (OFDM) technique has been frequently applied to multiple wireless communication protocols, for example, a wireless access in the vehicular environment (WAVE) communication, or a $3^{rd}$ generation partnership project-long term evolution (3GPP-LTE) to implement physical layer data transmission.

Regarding a physical layer part of IEEE 802.11P vehicle communication, most of the specification thereof is a continuation of the content of a wireless local area network (WLAN), and only a bandwidth and power are slightly modified, and a main difference there between is that a wireless mobile channel becomes more complicated. Regarding a design of a receiving end, in order to cope with various outdoor environments, more considerations on a channel estimation technique are required.

Regarding an adopted least-mean-square (LMS) algorithm, since each recursive tracking requires a large amount of complex multiplication operations, a large amount of hardware is required and power loss is increased.

SUMMARY OF THE DISCLOSURE

The disclosure is directed to an apparatus and a method for channel estimation, by which a Costas channel estimation mechanism is adopted, which is a simple and power saving method without performing a complex multiplication operation.

The disclosure provides a channel estimation apparatus including a de-mapping circuit, a Costas channel estimation circuit, a loop filter circuit and a smooth circuit. The de-mapping circuit receives a plurality of preambles, and maps the preambles corresponding to a plurality of channels into a real part and an imaginary part of a quadrature phase shift keying (QPSK) coordinate according to a complex form, where the real part is represented by I, and the imaginary part is represented by Q. The Costas channel estimation circuit includes a binary frequency channel estimation circuit and a quadrature frequency channel estimation circuit adapted to respectively perform operations on the real part and the imaginary part according to one of a BPSK structure and a QPSK structure, where Sign (x) represents a sign circuit taking a sign of a positive value or a negative value of the x value, and the binary frequency channel estimation circuit performs a calculation of (Q−I)*Sign (I+Q), and the quadrature frequency channel estimation circuit performs a calculation of Q*Sign (I)−I*Sign (Q) to output an output value. The loop filter circuit filters the output value under a time domain. The smooth circuit receives an output of the loop filter circuit to perform a smooth processing under a frequency domain, and outputs the preambles processed with the smooth processing to external, and feeds back the same to the de-mapping circuit, such that the de-mapping circuit, the Costas channel estimation circuit, the loop filter circuit and the smooth circuit continue channel estimation of a next loop, where phases of the preambles are adjusted according to a direction of the output value of the Costas channel estimation circuit approaching to zero in the next loop.

The disclosure provides a channel estimation method, which includes following steps. A de-mapping circuit is applied to receive a plurality of preambles, and the preambles corresponding to a plurality of channels are mapped into a real part and an imaginary part of a quadrature phase shift keying (QPSK) coordinate according to a complex form, where the real part is represented by I, and the imaginary part is represented by Q. A binary frequency channel estimation circuit and a quadrature frequency channel estimation circuit of a Costas channel estimation circuit are respectively applied to respectively perform operations on the real part and the imaginary part according to one of a BPSK structure and a QPSK structure, where Sign (x) represents a sign circuit taking a sign of a positive value or a negative value of the x value, and the binary frequency channel estimation circuit is applied to perform a calculation of (Q−I)*Sign (I+Q), and the quadrature frequency channel estimation circuit is applied to perform a calculation of Q*Sign (I)−I*Sign (Q) to output an output value. A loop filter circuit is applied to filter the output value under a time domain. A smooth circuit is applied to receive an output of the loop filter circuit to perform a smooth processing under a frequency domain, and output the preambles processed with the smooth processing to external, and feed back the same to the de-mapping circuit, such that the de-mapping circuit, the Costas channel estimation circuit, the loop filter circuit and the smooth circuit continue channel estimation of a next loop, where phases of the preambles are adjusted according to a direction of the output value of the Costas channel estimation circuit approaching to zero in the next loop.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Considering a power saving effect, the disclosure adopts a Costas channel estimation method, by which a complex multiplication operation is not required, and each sub-carrier only has one adaptive adjustment filter, so as to achieve a system requirement in a simple and power saving manner.

In a conventional orthogonal frequency division multiplexing (OFDM) receiver, an interpolation technique or other techniques are adopted to perform channel estimation according to a pilot tone gain. However, in case of a high-speed mobile application, the Doppler Effect may spoil an orthogonal property between sub-carriers used in the OFDM technique to cause an inter-carrier interference (ICI). Moreover, in the high-speed mobile application, the channels may change a power delay profile (PDP), such that a channel estimation method based on the interpolation technique is no longer reliable. Therefore, in the high-speed mobile application, the existing OFDM system generally encounters a problem of overall performance decline.

Regarding the high-speed mobile OFDM system, the disclosure provides a method for performing channel estimation in collaboration with channel tracking, and low complexity and low power decision is performed to achieve a better system performance, by which iteration channel estimation and the ICI elimination are achieved, so as to achieve an effect of saving a hardware area. The disclosure adopts a Costas tracking loop to replace a conventional least-mean-square (LMS) filtering method to progressively approach a convergence value of a channel parameter, such that the channel estimation technique has good adaptability. The disclosure is applied in a vehicle high-speed mobile communication system and is compatible to the OFDM, and provides good channel estimation under a plurality of channel environments. Meanwhile, the hardware cost is further decreased to satisfy an actual application.

Generally, a channel estimation module of the OFDM receiver estimates a channel effect in a frequency domain according to a characteristic of fore-and-aft long preambles after transformation of a fast Fourier transform (FFT) module at a receiving end, and an equalizer and a soft-de-mapping module are applied to restore a signal of the receiving end, and the channel estimation generally adopts a Wiener filtering technique to smooth an estimation result, so as to achieve more accurate estimation and equalization effect.

A plurality of embodiments is provided to describe the disclosure, though the disclosure is not limited to the provided embodiments.

Figure 1:
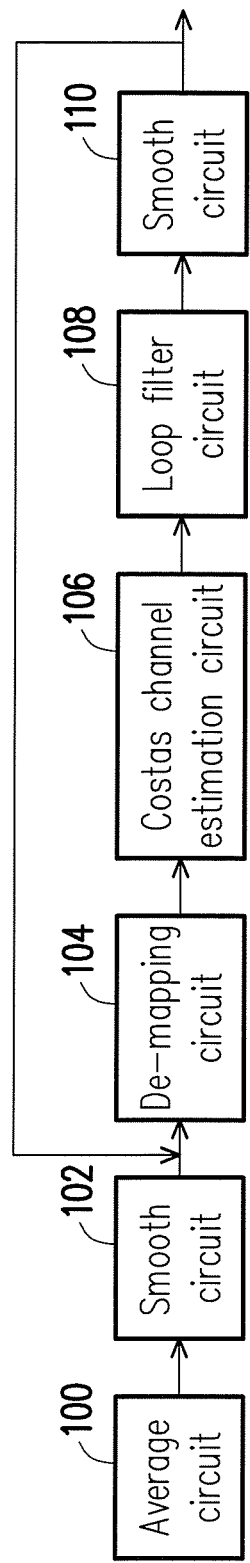
FIG. 1 is a schematic diagram of a channel estimation apparatus according to an embodiment of the disclosure.

FIG. 1 is a schematic diagram of a channel estimation apparatus according to an embodiment of the disclosure. Referring to FIG. 1, the channel estimation apparatus includes a de-mapping circuit 104, a Costas channel estimation circuit 106, a loop filter circuit 108 and a smooth circuit 110. The de-mapping circuit 104 receives a plurality of preambles. The preambles are first transformed through FFT, and are then processed by an average circuit 100 and a smooth circuit 102 and received by the de-mapping circuit 104.

Figure 2:
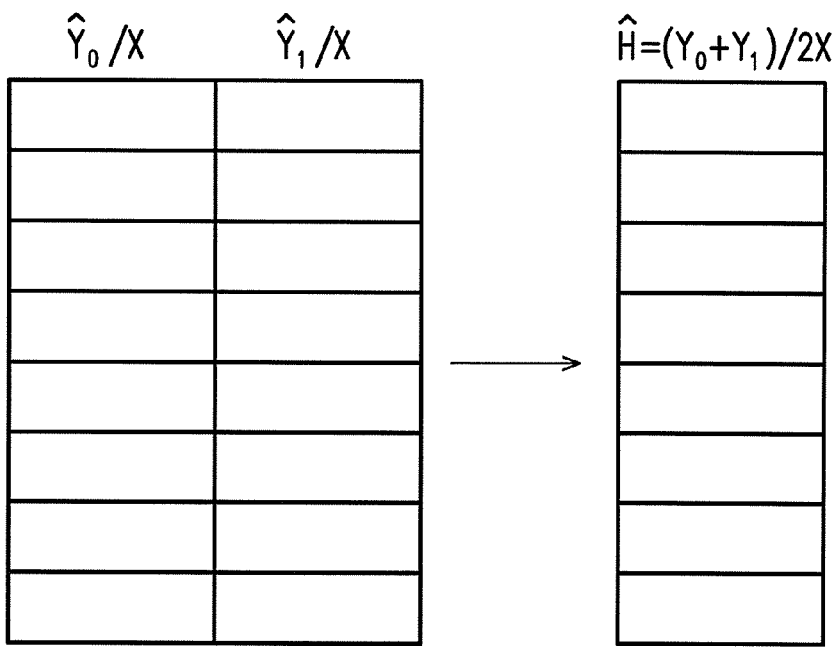
FIG. 2 is an operation schematic diagram of the average circuit according to an embodiment of the disclosure.

FIG. 2 is an operation schematic diagram of the average circuit according to an embodiment of the disclosure. Referring to FIG. 1 and FIG. 2, regarding data processed through the FFT, each channel generally has two preambles $\hat{Y}_0$ and $\hat{Y}_1$ with a same format. Therefore, by averaging the two initial preambles $\hat{Y}_0/\hat{X}$ and $\hat{Y}_1/\hat{X}$, a set of preambles $\hat{H}$ of the corresponding channel is obtained to decrease the noise. The average operation is as follows:

$$\hat{H} = \frac{(Y_0 + Y_1)}{2X}.$$

Implementation of the average circuit is not limited to a specific circuit structure, and any circuit structure is applicable as long as the above operation is implemented.

Figure 3:
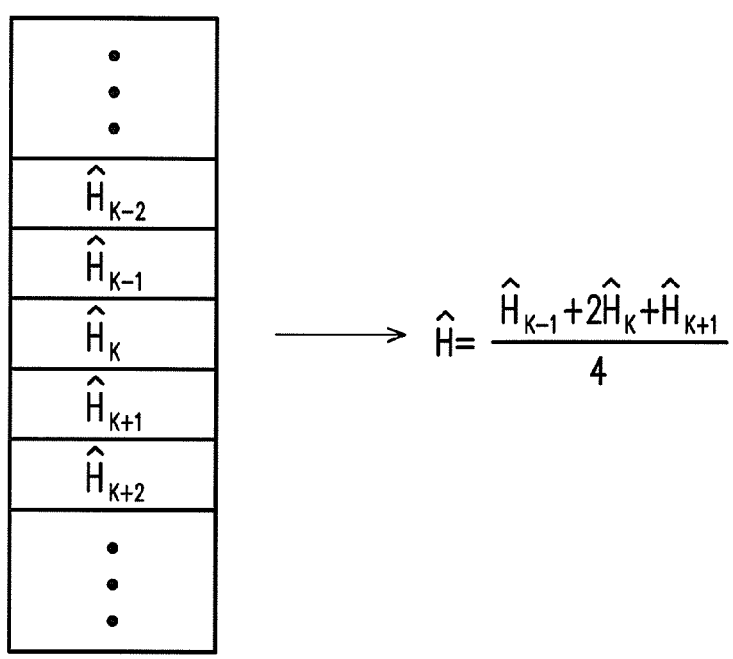
FIG. 3 is an operation schematic diagram of the average circuit according to an embodiment of the disclosure.

FIG. 3 is an operation schematic diagram of the average circuit according to an embodiment of the disclosure. Referring to FIG. 1 and FIG. 3, the preambles $\hat{H}$ obtained through the average circuit 100 is further processed by the smooth circuit 102, and an operation relationship is as follows:

$$\hat{H} = \frac{\hat{H}_{k-1} + 2\hat{H}_k + \hat{H}_{k+1}}{4}.$$

After the preambles $\hat{H}$ are processed by the smooth circuit 102, some noises have been removed, and then the preambles $\hat{H}$ are input to the de-mapping circuit 104 to map the preambles $\hat{H}$ into a real part and an imaginary part of a binary phase shift keying (BPSK) structure or a quadrature phase shift keying (QPSK) structure according to a complex form, where the real part is represented by I, and the imaginary part is represented by Q.

Figure 4:
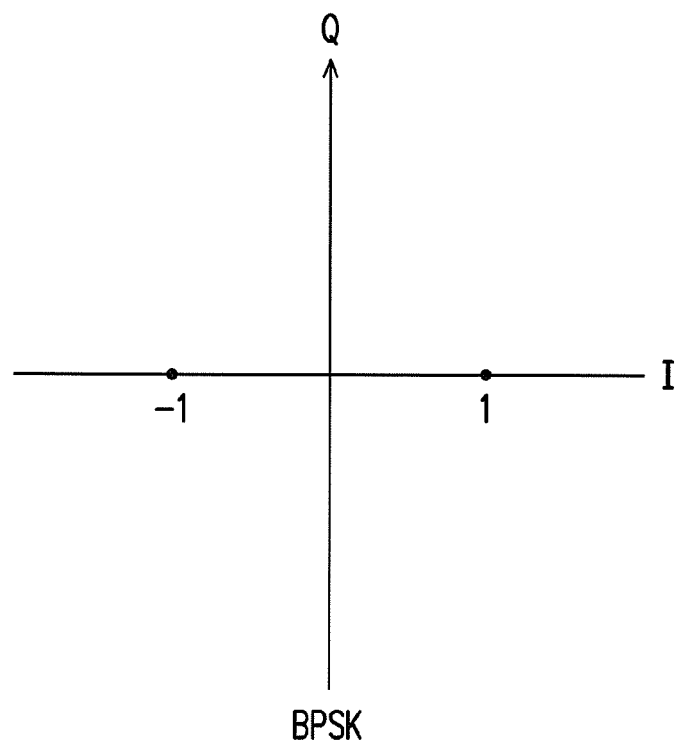
FIG. 4 is a schematic diagram of a BPSK structure according to an embodiment of the disclosure.

FIG. 4 is a schematic diagram of the BPSK structure according to an embodiment of the disclosure. Referring to FIG. 1 and FIG. 4, the data of the BPSK structure is one bit, which is indicated on channel positions of −1 and 1 on an I axis or a Q axis. The ideal channel positions are the channel positions of −1 and 1, though an actual signal position is oscillated and varied between the channel positions of −1 and 1, and the oscillation phenomenon thereof is described in detail later.

Figure 5:
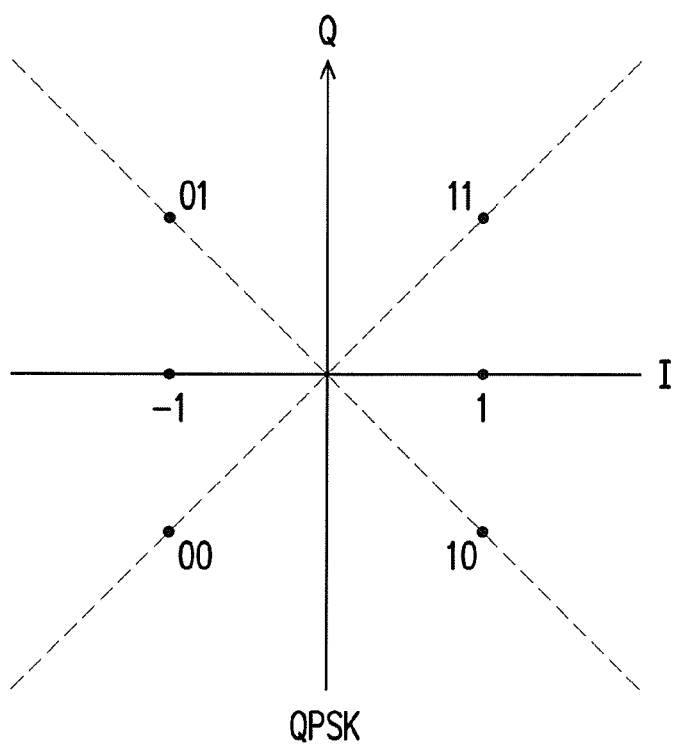
FIG. 5 is a schematic diagram of a QPSK structure according to an embodiment of the disclosure.

FIG. 5 is a schematic diagram of the QPSK structure according to an embodiment of the disclosure. Referring to FIG. 1 and FIG. 5, the data of the QPSK structure is two bits, which are indicated on oblique lines including an angle of 45 degrees with the I/O axis on an I−Q plane. The ideal channel positions are channel positions at 00, 11, 01, 10, though an actual signal position is oscillated and varied between the above channel positions, and the oscillation phenomenon thereof is described in detail later.

Figure 6:
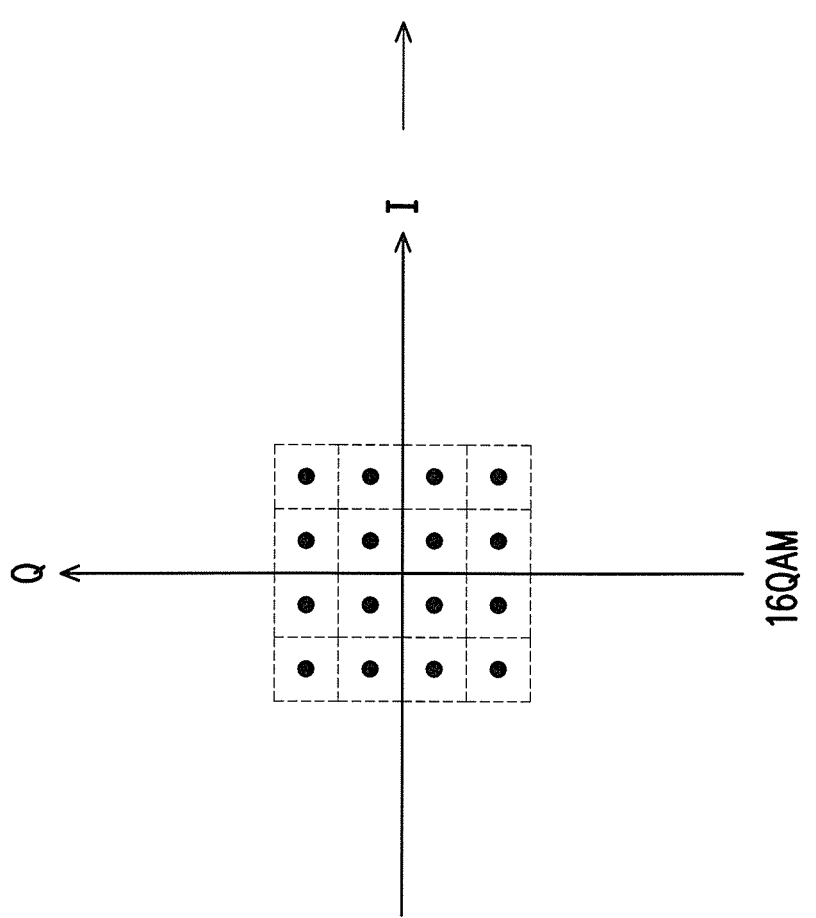
FIG. 6 is a schematic diagram of a 16QAM soft decision structure according to an embodiment of the disclosure.
Figure 6:
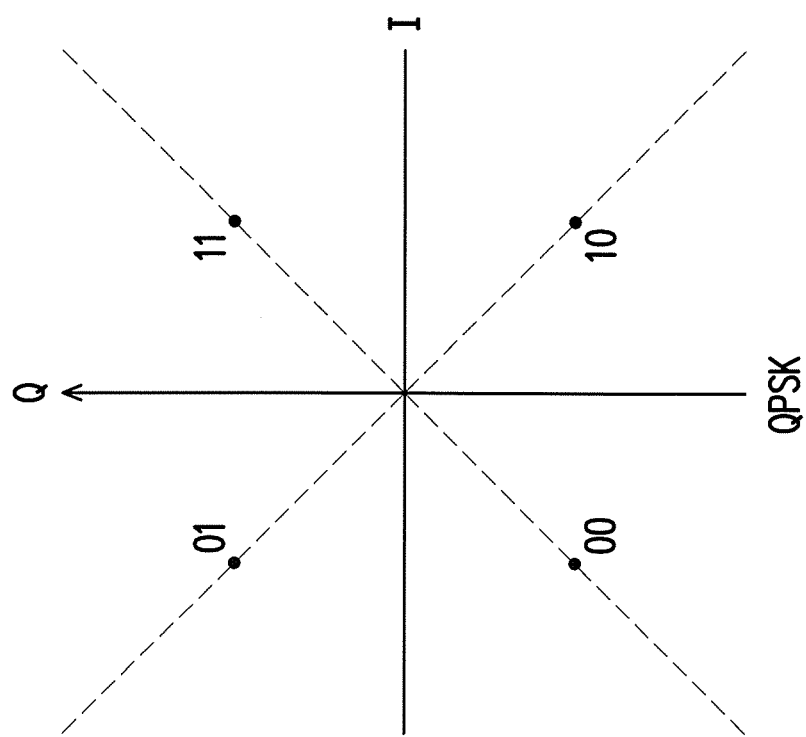
Figure 7:
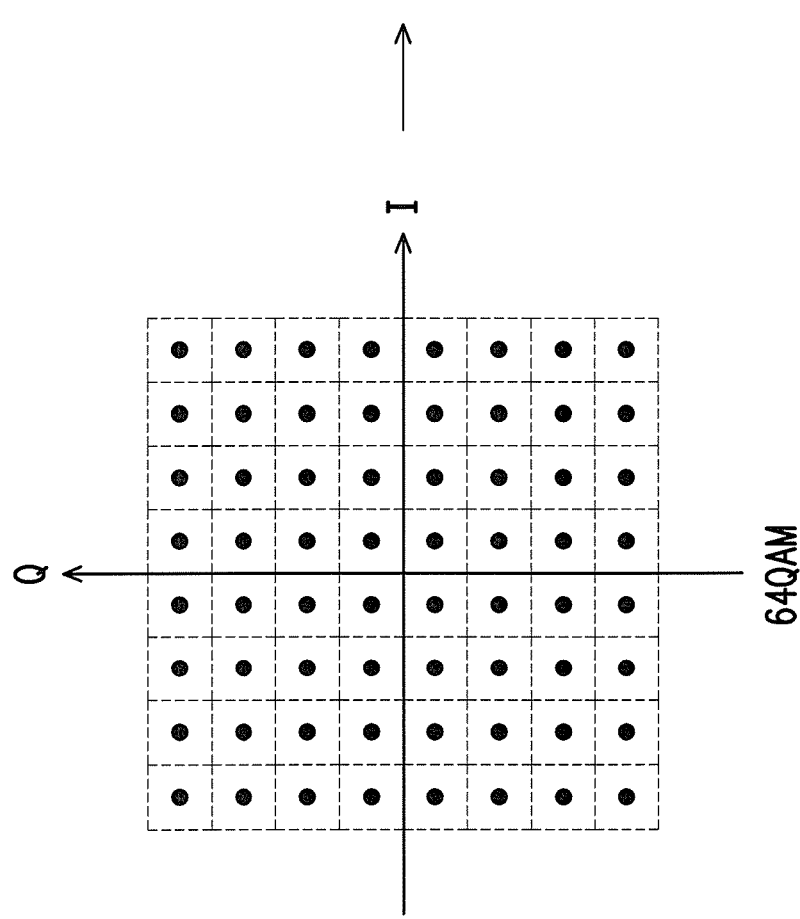
FIG. 7 is a schematic diagram of a 64QAM soft decision structure according to an embodiment of the disclosure.
Figure 7:
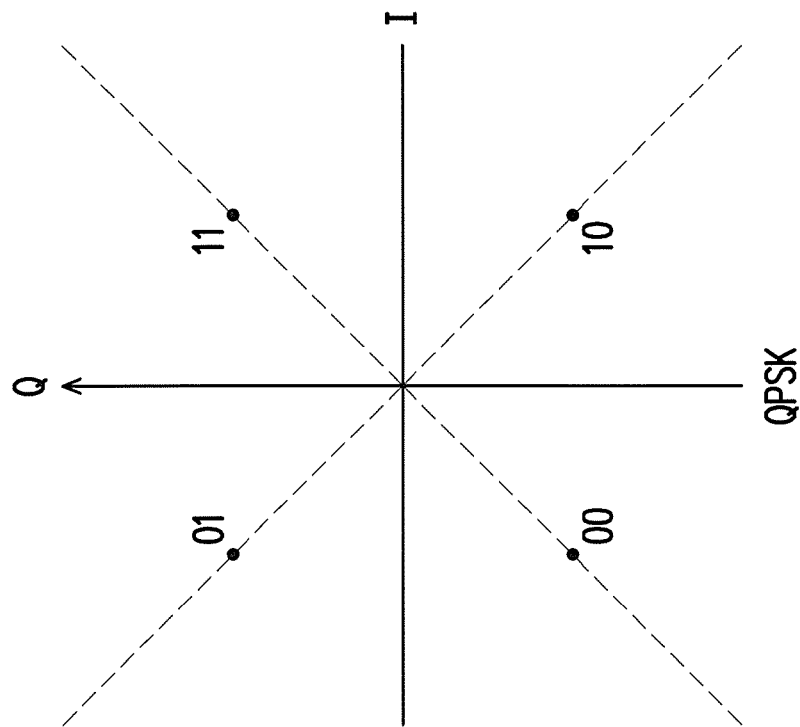

Based on development of communication technology, the data used for describing the sub-carrier is not limited to the BPSK structure or the QPSK structure, and more bits are used for describing the state of the sub-carrier, and a method of quadrature amplitude modulation (QAM) becomes very popular. Therefore, in collaboration with the Costas channel estimation mechanism, the preambles processed by the de-mapping circuit 104 are required to perform de-mapping decision to map the data of 16QAM and 64QAM to the QPSK coordinate to implement the simple Costas channel estimation. FIG. 6 is a schematic diagram of a 16QAM soft decision structure according to an embodiment of the disclosure. Referring to FIG. 6, taking the QPSK structure as an example, data of 16 points in the 16QAM structure are required to be mapped to the channel positions on the QPSK structure. Similarly, FIG. 7 is a schematic diagram of a 64QAM soft decision structure according to an embodiment of the disclosure. Referring to FIG. 7, taking the QPSK structure as an example, data of 64 points in the 64QAM structure are required to be mapped to the channel positions on the QPSK structure. After the mapping operation of the de-mapping circuit 104, the real part I and the imaginary part Q of the corresponding channel on the QPSK structure received by the current loop are obtained.

Then, referring to FIG. 1, the Costas channel estimation circuit 106 includes a binary frequency channel estimation circuit and a quadrature frequency channel estimation circuit, which respectively receive the real part (I) and the imaginary part (Q) output according to one of the BPSK structure and the QPSK structure, where Sign (x) represents a sign circuit taking a sign of a positive value or a negative value of the x value, and the binary frequency channel estimation circuit performs is a calculation of (Q–I)*Sign (I+Q), and the quadrature frequency channel estimation circuit performs a calculation of Q*Sign (I)–I*Sign (Q). The Costas channel estimation circuit 106 outputs an output value.

Figure 8:
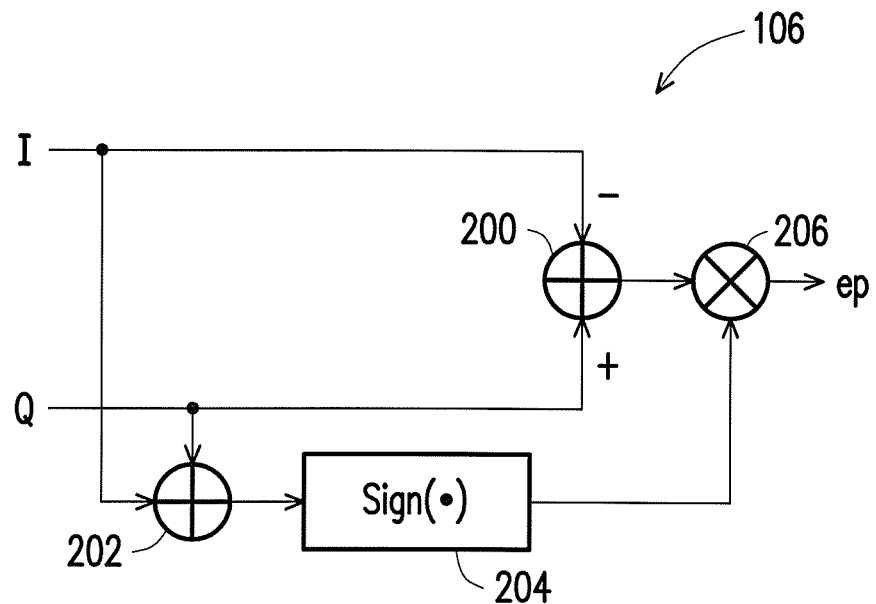
FIG. 8 is a schematic diagram of a binary frequency channel estimation circuit according to an embodiment of the disclosure.

FIG. 8 is a schematic diagram of a binary frequency channel estimation circuit according to an embodiment of the disclosure. Referring to FIG. 1 and FIG. 8, the binary frequency channel estimation circuit of the Costas channel estimation circuit 106 performs the calculation of (Q–I)*Sign (I+Q) under the BPSK structure. The binary frequency channel estimation circuit includes a first adder 200, and the first adder 200 receives the real part (I) and the imaginary part (Q) to perform a calculation of (Q–I), and outputs the value of (Q–I). A second adder 202 receives the real part (I) and the imaginary part (Q) to perform a calculation of (Q+I), and outputs the value of (Q+I). A sign circuit 204 receives the value of (Q+I), and outputs a sign value of 1 or –1 according to a positive value or a negative value. A multiplier 206 multiplies the value of (Q–I) with the sign value to output (Q–1)*Sign (I+Q), which is represented by ep.

The aforementioned operation circuit for calculating (Q–I)*Sign (I+Q) is only an example, and the disclosure is not limited thereto, and any operation circuit is applicable as long as the aforementioned calculation is implemented. The value of (Q–I)*Sign (I+Q) may be greater than zero, smaller than zero or equal to zero, where the value of zero is the ideal channel value, though an actual value of (Q–I)*Sign (I+Q) is oscillated around zero to result in the above situation that the value of (Q–I)*Sign (I+Q) is greater than zero or smaller than zero, though after a plurality of recursions, the value is expected to be converged to zero.

Figure 9:
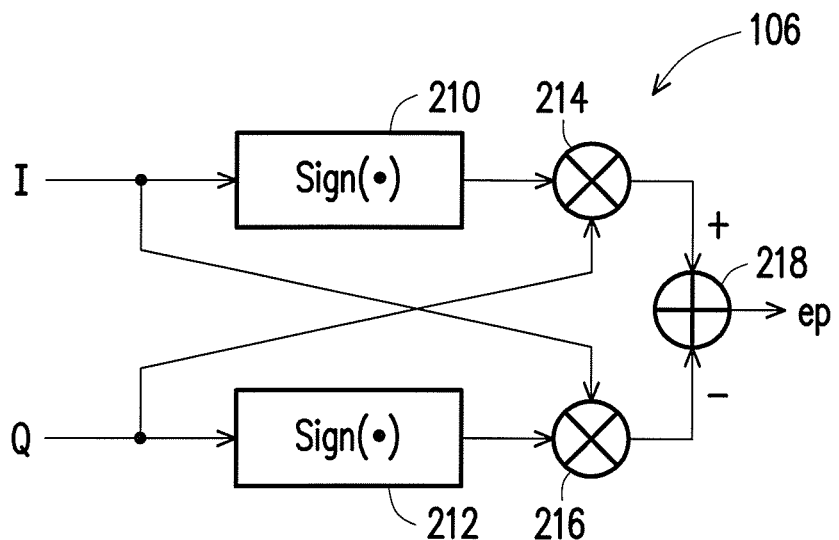
FIG. 9 is a schematic diagram of a quadrature frequency channel estimation circuit according to an embodiment of the disclosure.

FIG. 9 is a schematic diagram of a quadrature frequency channel estimation circuit according to an embodiment of the disclosure. Referring to FIG. 1 and FIG. 9, the quadrature frequency channel estimation circuit of the Costas channel estimation circuit 106 perform is the calculation of Q*Sign (I)–I*Sign (Q) under the QPSK structure. The quadrature frequency channel estimation circuit includes a sign circuit 210, a second sign circuit 212, a first multiplier 214, a second multiplier 216 and an adder 218. The first sign circuit 210 receives the real part (I), and outputs a first sign value of 1 or –1 according to a positive value or a negative value. The second sign circuit 212 receives the imaginary part (Q), and outputs a second sign value of 1 or –1 according to a positive value or a negative value. The first multiplier 214 multiplies the first sign value by the imaginary part (Q) to obtain a first multiplication value. The second multiplier 216 multiplies the second sign value by the real part (I) to obtain a second multiplication value. The adder 218 performs a calculation of subtracting the first multiplication value by the second multiplication value to output an output value ep. The output value ep is the value of Q*Sign (I)–I*Sign (Q).

The aforementioned operation circuit for calculating Q*Sign (I)–I*Sign (Q) is only an example, and the disclosure is not limited thereto, and any operation circuit is applicable as long as the aforementioned calculation is implemented. The value of Q*Sign (I)–I*Sign (Q) may be greater than zero, smaller than zero or equal to zero, where the value of zero is the ideal channel value, though an actual value of Q*Sign (I)–I*Sign (Q) is oscillated around zero to result in the above situation that the value of Q*Sign (I)–I*Sign (Q) is greater than zero or smaller than zero, though after a plurality of recursions, the value is expected to be converged to zero.

Figure 10:
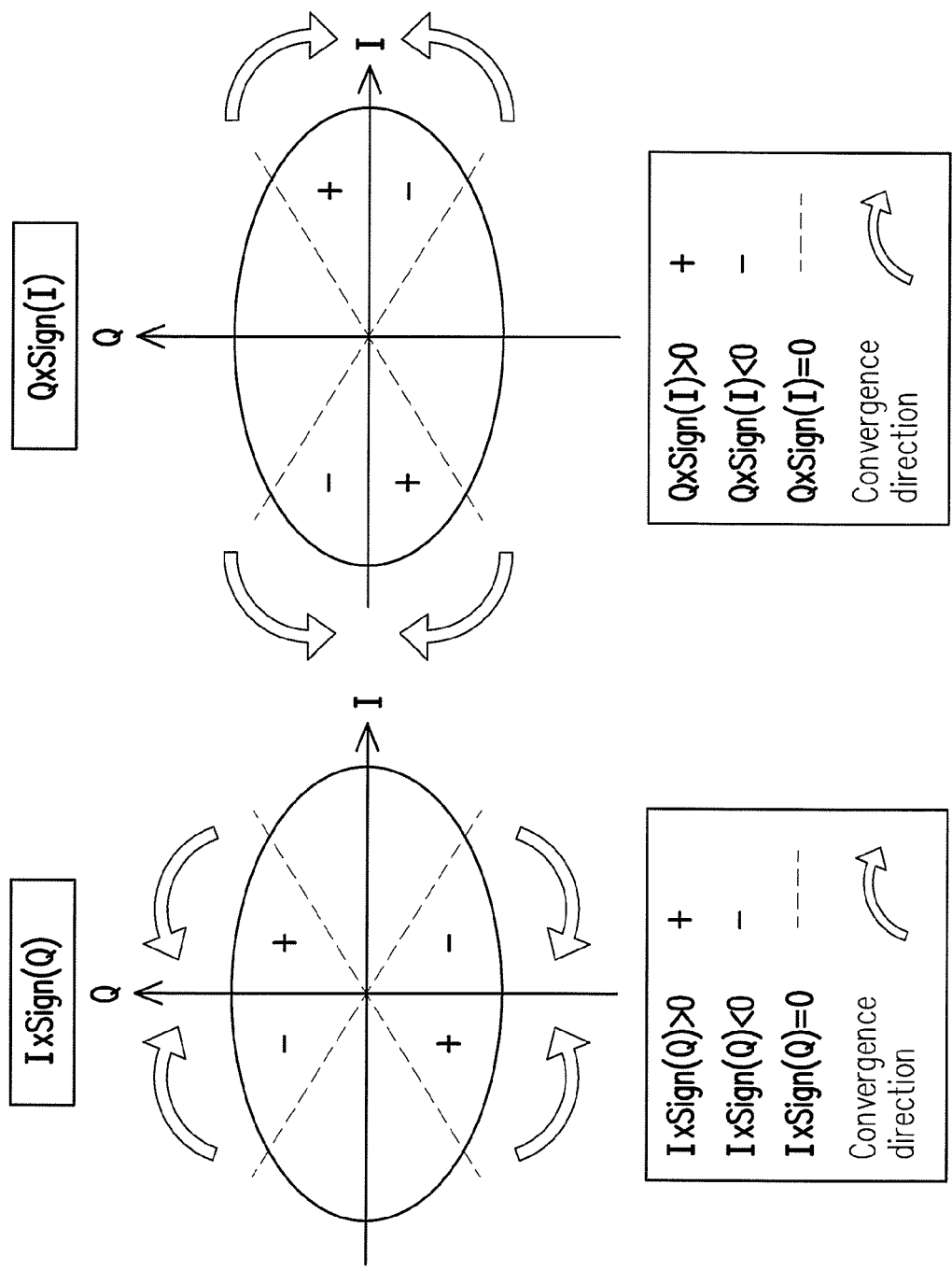
FIG. 10 is a schematic diagram of a convergence mechanism of (Q−I)*Sign (I+Q) corresponding to the BPSK structure according to an embodiment of the disclosure.

The convergence mechanism is described as follows. FIG. 10 is a schematic diagram of a convergence mechanism of (Q–I)*Sign (I+Q) corresponding to the BPSK structure according to an embodiment of the disclosure. Under the BPSK structure, the ideal channel positions are on the I axis and the Q axis. Referring to FIG. 10, the left diagram is, for example, an oscillation of the I value, which is a calculation of (I)*Sign (Q). The region with the value greater than zero is indicated by "+", and the region with the value smaller than zero is indicated by "–". The arrows indicate a convergence direction. Further, the right diagram of FIG. 10 is an oscillation of the Q value as an example, which is a calculation of (Q)*Sign (I). The region with the value greater than zero is indicated by "+", and the region with the value smaller than zero is indicated by "–". The arrows indicate a convergence direction.

Figure 11:
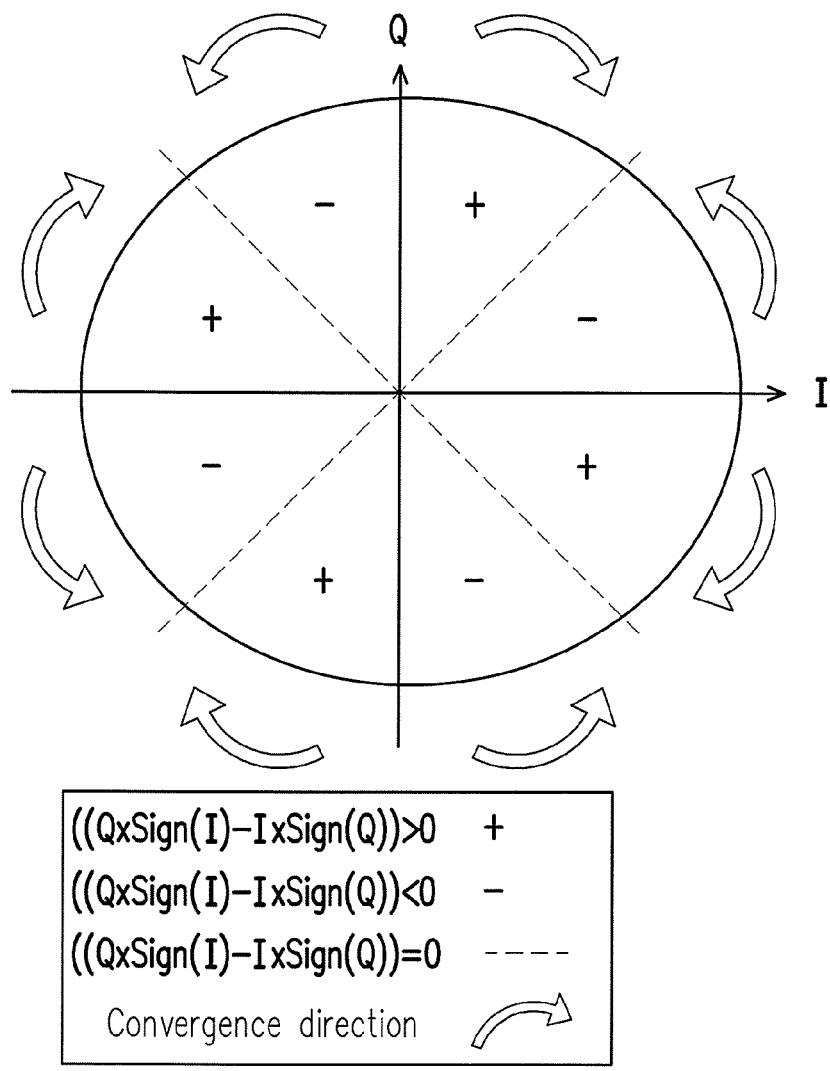
FIG. 11 is a schematic diagram of a convergence mechanism of Q*Sign (I)−I*Sign (Q) corresponding to the QPSK structure according to an embodiment of the disclosure.

FIG. 11 is a schematic diagram of a convergence mechanism of Q*Sign (I)–I*Sign (Q) corresponding to the QPSK structure according to an embodiment of the disclosure. Under the QPSK structure, the ideal channel positions are on oblique lines including an angle of 45 degrees with the I axis or the Q axis. FIG. 11 illustrates the operation of Q*Sign(I)–I*Sign(Q). The region with the value greater than zero is indicated by "+", and the region with the value smaller than zero is indicated by "–". The arrows indicate a convergence direction.

Figure 12:
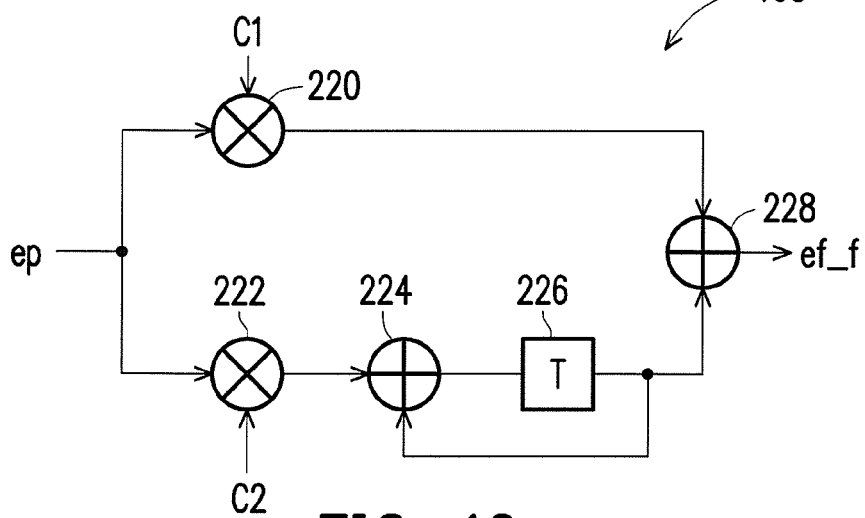
FIG. 12 is a schematic diagram of a loop filter circuit according to an embodiment of the disclosure.

Then, the loop filter circuit 108 of FIG. 1 is described below. The loop filter circuit 108 filters the output value under a time domain. FIG. 12 is a schematic diagram of the loop filter circuit according to an embodiment of the disclosure. Referring to FIG. 1 and FIG. 12, the loop filter circuit 108 in an example performs a filtering operation of F(z):

$$F(z) = C1 + \frac{C2}{1 - z^{-1}}$$

Where, z is an input signal, C1 and C2 are given coefficients. The loop filter circuit 108, for example, includes a first multiplier 220, a second multiplier 222, a first adder 224, a T circuit 226 and a second adder 228. The first multiplier 220 multiplies C1 by ep. The second multiplier 222 multiplies C2 by ep. The first adder 224 receives an output of the second multiplier 222, and adds the same with a feedback value of the T circuit 226. The second adder 228 adds the outputs of the first multiplier 220 and the T circuit 226 to output an output value, which is represented by ef_f.

The aforementioned loop filter circuit performing the filtering operation of F(z) is only an example, and the invention is not limited thereto, and any filter circuit is applicable as long as the aforementioned calculation is implemented. Formation of F(z) may also be varied to perform phase locked filtering under the time domain.

Referring to FIG. 1 again, after the loop filtering circuit 108, the smooth circuit 110 receives the output of the loop filter circuit 108 to perform a smooth processing under a frequency domain, and outputs the preambles processed with the smooth processing to external to a post equalizer as an example. Moreover, the preambles are also fed back to the de-mapping circuit 104, such that the de-mapping circuit 104, the Costas channel estimation circuit 106, the loop filter circuit 108 and the smooth circuit 110 continue channel estimation of a next loop. In the channel tracking of the next loop, the phases of the preambles are adjusted according to a direction of the output value of the Costas channel estimation circuit 106 approaching to zero, so as to be converged to zero to achieve the channel tracking effect.

The operation content of the smooth circuit 110 is the same to that of the smooth circuit 102, which is also the operation of $$\hat{H} = \frac{\hat{H}_{k-1} + 2\hat{H}_k + \hat{H}_{k+1}}{4}$$

including the channel estimation effect, and the preambles are fed back to the de-mapping circuit 104 for adjustment, and the channel may be locked after multiple loops.

Figure 13:
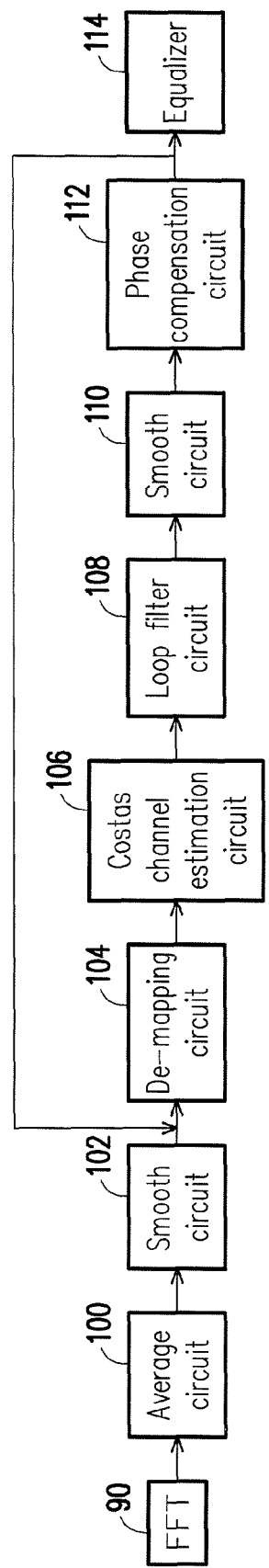
FIG. 13 is a schematic diagram of a channel estimation apparatus according to an embodiment of the disclosure.

According to the structure of FIG. 1, an integral application thereof is as follows. FIG. 13 is a schematic diagram of a channel estimation apparatus according to an embodiment of the disclosure. Referring to FIG. 13, the sub-carrier signal received through multiple channels is first transformed by a FFT 90, and then processed by the average circuit 100 and the smooth circuit 102 of the initial stage. In the present embodiment, after processed by the smooth circuit 110 and before feeding back to the de-mapping circuit 104, the signal is further processed by a phase compensation circuit 112 for phase compensation, and is then fed back to the de-mapping circuit 104. The signal processed by the phase compensation circuit 112 may be output to the equalizer 114 for post processing.

Figure 14:
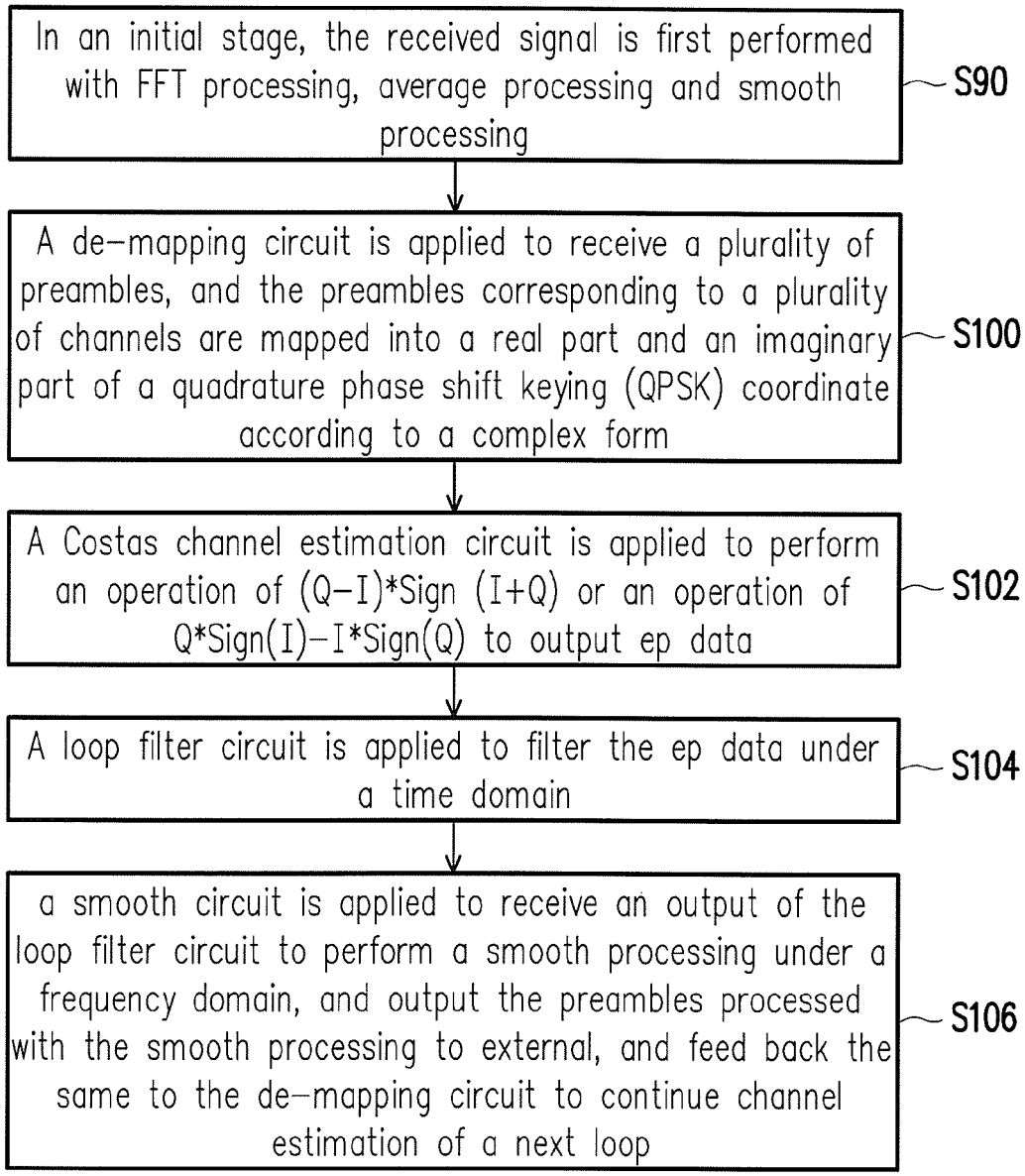
FIG. 14 is a flowchart of a channel estimation method according to an embodiment of the disclosure.

According to the above descriptions, the disclosure provides a channel estimation method. FIG. 14 is a flowchart of the channel estimation method according to an embodiment of the disclosure. Referring to FIG. 14, step S90 is the initial stage, in which the received signal is first performed with FFT processing, average processing and smooth processing. In step S100, a de-mapping circuit is applied to receive a plurality of preambles, and the preambles corresponding to a plurality of channels are mapped into a real part and an imaginary part of a QPSK coordinate according to a complex form, where the real part is represented by I, and the imaginary part is represented by Q. Then, in step S102, a binary frequency channel estimation circuit and a quadrature frequency channel estimation circuit of a Costas channel estimation circuit are respectively applied to respectively perform operations on the real part and the imaginary part according to one of a BPSK structure and a QPSK structure, where Sign (x) represents a sign circuit taking a sign of a positive value or a negative value of the x value, and the binary frequency channel estimation circuit is applied to perform a calculation of (Q−I)*Sign (I+Q), and the quadrature frequency channel estimation circuit is applied to perform a calculation of Q*Sign (I)−I*Sign (Q) to output an output value. In step S104, a loop filter circuit is applied to filter the output value under a time domain, which is, for example, the filtering operation of $$F(z) = C1 + \frac{C2}{1 - z^{-1}}.$$

In step S106, a smooth circuit is applied to receive an output of the loop filter circuit to perform a smooth processing under a frequency domain, and output the preambles processed with the smooth processing to external, and feed back the same to the de-mapping circuit, such that the de-mapping circuit, the Costas channel estimation circuit, the loop filter circuit and the smooth circuit continue channel estimation of a next loop, where in the next loop, the phases of the preambles are adjusted according to a direction of the output value of the Costas channel estimation circuit approaching to zero.

In summary, in the disclosure, the Costas channel estimation circuit 106 is applied to construct a compensation loop to lock the channel, so as to decrease complexity of the circuit and accordingly decrease power consumption of the circuit.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A channel estimation apparatus, comprising:
a de-mapping circuit, receiving a plurality of preambles, and mapping the preambles corresponding to a plurality of channels into a real part (I) and an imaginary part (Q) of a quadrature phase shift keying coordinate according to a complex form;
a Costas channel estimation circuit, comprising a binary frequency channel estimation circuit and a quadrature frequency channel estimation circuit adapted to respectively perform operations on the real part and the imaginary part according to one of a binary phase shift keying structure and a quadrature phase shift keying structure, wherein the binary frequency channel estimation circuit performs a calculation of "the imaginary part minus the real part" times "a sign value of the real part plus the imaginary part" ((Q−I)*Sign (I+Q)), and the quadrature frequency channel estimation circuit performs a calculation of "the imaginary part times a sign value of the imaginary part" minus "the real part times a sign value of the imaginary part" (Q*Sign (I)−I*Sign (Q)) to output an output value;
a loop filter circuit, filtering the output value under a time domain; and
a smooth circuit, receiving an output of the loop filter circuit to perform a smooth processing under a frequency domain, and outputting the preambles processed with the smooth processing to external, and feeding back the same to the de-mapping circuit, such that the de-mapping circuit, the Costas channel estimation circuit, the loop filter circuit and the smooth circuit continue channel estimation of a next loop;

wherein in the next loop, phases of the preambles are adjusted according to a direction of the output value of the Costas channel estimation circuit approaching to zero.

2. The channel estimation apparatus as claimed in claim 1, wherein the preambles received by the de-mapping circuit are first performed with initial fast Fourier transform processing, average processing and smooth processing.

3. The channel estimation apparatus as claimed in claim 1, further comprising:
   a phase compensation circuit, wherein after being processed by the smooth circuit, the preambles are first processed by the phase compensation circuit before feeding back to the de-mapping circuit, wherein the phase compensation circuit is adjusted according to the direction of the output value of the Costas channel estimation circuit approaching to zero.

4. The channel estimation apparatus as claimed in claim 1, wherein the binary frequency channel estimation circuit comprises:
   a first adder, receiving the real part and the imaginary part, performing an operation of "the imaginary part minus the real part (Q−I)", and outputting a first value;
   a second adder, receiving the real part and the imaginary part, performing an operation of "the imaginary part plus the real part (Q+I)", and outputting a second value;
   a sign circuit, receiving the second value, and outputting a sign value of 1 or −1 according to a positive value or a negative value; and
   a multiplier, multiplying the first value by the sign value to output the output value.

5. The channel estimation apparatus as claimed in claim 1, wherein the quadrature frequency channel estimation circuit comprises:
   a first sign circuit, receiving the real part, and outputting a first sign value of 1 or −1 according to a positive value or a negative value;
   a second sign circuit, receiving the imaginary part, and outputting a second sign value of 1 or −1 according to a positive value or a negative value;
   a first multiplier, multiplying the first sign value by the imaginary part to obtain a first multiplication value;
   a second multiplier, multiplying the second sign value by the real part to obtain a second multiplication value; and
   an adder, subtracting the first multiplication value by the second multiplication value to output the output value.

6. The channel estimation apparatus as claimed in claim 1, wherein the loop filter circuit performs an operation of F(z): a first constant (C1) plus "a second constant (C2) divided by 1 minus a reciprocal of an input signal ($z^{-1}$)"

$$\left(F(z) = C1 + \frac{C2}{1-z^{-1}}\right).$$

7. The channel estimation apparatus as claimed in claim 1, wherein the smooth circuit is to perform a following mathematical operation on $\hat{H}_k$ according to n sets of input data $\hat{H}_1 \ldots \hat{H}_k \ldots \hat{H}_n$ of n channels:
"twice of $\hat{H}_k$ plus adjacent $\hat{H}_{k-1}$ and $\hat{H}_{k+1}$" divided by 4

$$\left(\hat{H} = \frac{(\hat{H}_{k-1} + 2\times\hat{H}_k + \hat{H}_{k+1})}{4}\right).$$

8. The channel estimation apparatus as claimed in claim 1, wherein the preambles are data of a 16QAM structure or a 64QAM structure, wherein QAM is quadrature amplitude modulation.

9. A channel estimation method, comprising:
   applying a de-mapping circuit to receive a plurality of preambles, and mapping the preambles corresponding to a plurality of channels into a real part and an imaginary part of a quadrature phase shift keying coordinate according to a complex form, wherein the real part is represented by I, and the imaginary part is represented by Q;
   applying a binary frequency channel estimation circuit and a quadrature frequency channel estimation circuit of a Costas channel estimation circuit to respectively perform operations on the real part and the imaginary part according to one of a binary phase shift keying structure and a quadrature phase shift keying structure, wherein the binary frequency channel estimation circuit is applied to perform a calculation of "the imaginary part minus the real part" times "a sign value of the real part plus the imaginary part" ((Q−I)*Sign (I+Q)), and the quadrature frequency channel estimation circuit is applied to perform a calculation of "the imaginary part times a sign value of the real part" minus "the real part times a sign value of the imaginary part" (Q*Sign (I)−I*Sign (Q)) to output an output value;
   applying a loop filter circuit to filter the output value under a time domain; and
   applying a smooth circuit to receive an output of the loop filter circuit to perform a smooth processing under a frequency domain, and outputting the preambles processed with the smooth processing to external, and feeding back the same to the de-mapping circuit, such that the de-mapping circuit, the Costas channel estimation circuit, the loop filter circuit and the smooth circuit continue channel estimation of a next loop,
   wherein in the next loop, phases of the preambles are adjusted according to a direction of the output value of the Costas channel estimation circuit approaching to zero.

10. The channel estimation method as claimed in claim 9, wherein the preambles received by the de-mapping circuit are first performed with initial fast Fourier transform processing, average processing and smooth processing.

11. The channel estimation method as claimed in claim 9, further comprising:
   first performing a phase compensation on the preambles before feeding back the preambles to the de-mapping circuit after the preambles are processed by the smooth circuit, wherein the phase compensation circuit is adjusted according to the direction of the output value of the Costas channel estimation circuit approaching to zero.

12. The channel estimation method as claimed in claim 9, wherein the binary frequency channel estimation circuit comprises:
   a first adder, receiving the real part and the imaginary part, performing an operation of "the imaginary part minus the real part (Q−I)", and outputting a first value;

a second adder, receiving the real part and the imaginary part, performing an operation of "the imaginary part plus the real part (Q+I)", and outputting a second value;

a sign circuit, receiving the second value, and outputting a sign value of 1 or −1 according to a positive value or a negative value; and a multiplier, multiplying the first value by the sign value to output the output value.

13. The channel estimation method as claimed in claim 9, wherein the quadrature frequency channel estimation circuit comprises:

a first sign circuit, receiving the real part, and outputting a first sign value of 1 or −1 according to a positive value or a negative value;

a second sign circuit, receiving the imaginary part, and outputting a second sign value of 1 or −1 according to a positive value or a negative value;

a first multiplier, multiplying the first sign value by the imaginary part to obtain a first multiplication value;

a second multiplier, multiplying the second sign value by the real part to obtain a second multiplication value; and an adder, subtracting the first multiplication value by the second multiplication value to output the output value.

14. The channel estimation method as claimed in claim 9, wherein the loop filter circuit performs an operation of F(z):

a first constant (C1) plus "a second constant (C2) divided by 1 minus a reciprocal of an input signal $(z^{-1})$"

$$\left( F(z) = C1 + \frac{C2}{1 - z^{-1}} \right).$$

15. The channel estimation method as claimed in claim 9, wherein the smooth circuit is to perform a following mathematical operation on $\hat{H}_k$ according to n sets of input data $\hat{H}_1 \ldots \hat{H}_k \ldots \hat{H}_n$ of n channels:

"twice of $\hat{H}_k$ plus adjacent $\hat{H}_{k-1}$ and $\hat{H}_{k+1}$" divided by 4

$$\left( \hat{H} = \frac{(\hat{H}_{k-1} + 2 \times \hat{H}_k + \hat{H}_{k+1})}{4} \right).$$

16. The channel estimation method as claimed in claim 9, wherein the preambles are data of a 16QAM structure or a 64QAM structure, wherein QAM is quadrature amplitude modulation.

* * * * *